United States Patent [19]

Naemura

[11] Patent Number: 4,699,731
[45] Date of Patent: Oct. 13, 1987

[54] LIQUID CRYSTAL MATERIAL FOR A THERMAL WRITING LIQUID CRYSTAL ELEMENT

[75] Inventor: Shohei Naemura, Tokyo, Japan

[73] Assignee: NEC Corporation, Tokyo, Japan

[21] Appl. No.: 864,919

[22] Filed: May 20, 1986

[30] Foreign Application Priority Data

May 23, 1985 [JP] Japan .................................. 60-110740
May 23, 1985 [JP] Japan .................................. 60-110742

[51] Int. Cl.$^4$ ........................ G02F 1/13; C09K 19/12; C09K 19/20
[52] U.S. Cl. .......................... 252/299.66; 252/299.01; 252/299.5; 252/299.67; 350/350 R; 350/350 S; 350/351
[58] Field of Search ...................... 252/299.66, 299.67, 252/299.01, 299.5; 350/350 S, 350 R, 351

[56] References Cited

U.S. PATENT DOCUMENTS

| | | | |
|---|---|---|---|
| 4,040,047 | 8/1977 | Hareng et al. ................. | 252/299.01 |
| 4,139,273 | 2/1979 | Crossland et al. ............. | 252/299.01 |
| 4,196,974 | 4/1980 | Hareng et al. ................. | 252/299.01 |
| 4,528,116 | 7/1985 | Dabrowski et al. ........... | 252/299.63 |
| 4,621,901 | 11/1986 | Petrzilka et al. .............. | 252/299.63 |
| 4,645,305 | 2/1987 | Yokokura et al. ............. | 252/299.66 |

FOREIGN PATENT DOCUMENTS

| | | | |
|---|---|---|---|
| 169327 | 1/1986 | European Pat. Off. ....... | 252/299.63 |
| 2456083 | 6/1975 | Fed. Rep. of Germany ........................ | 252/299.66 |
| 50-23385 | 3/1975 | Japan .............................. | 252/299.66 |
| 53-113785 | 10/1978 | Japan .............................. | 252/299.66 |
| 59-122574 | 7/1984 | Japan .............................. | 252/299.66 |
| 60-166384 | 8/1985 | Japan .............................. | 252/299.66 |
| 60-255753 | 12/1985 | Japan .............................. | 252/299.67 |

OTHER PUBLICATIONS

Dabrowski, R., et al., Mol. Cryst. Liq. Cryst, vol. 102 (Letters), pp. 155–160 (1984).
Van Der Veen, J. Phys. (Fr.), Colloq., vol. 37, C3-13 (1976).
Demus, D., et al., Flussige Fristalle in Tabellen II, VEB Deutscher Verlag fur Grundstoffindustrie, Leipzig, No. 7093–7096, p. 130 (1984).
Dabrowski, R., et al., J. Physique, vol. 45, pp. 1213–1222 (1984).
Dewey, A. G., "The Physics and Chemistry of Liquid Crystal Devices," Sprokel, G., Ed, Plenum Press, N.Y., pp. 219–239 (1980).
Dubois, J. C., Annals De Physique, vol. 3, pp. 131–138 (1978).
Dubois, J. C., et al., J. Physique, Colloq C3, vol. 37, pp. C3-35–C3-40 (Jun. 1976).

*Primary Examiner*—Teddy S. Gron
*Attorney, Agent, or Firm*—Sughrue, Mion, Zinn, Macpeak, and Seas

[57] ABSTRACT

The liquid crystal material for use in a thermal writing liquid crystal element. The material contains essentially two components (a) and (c) or three components (a), (b) and (c);
(a) one or more than one of the compounds represented by the formula (I):

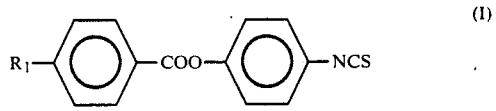

(I)

wherein $R_1$ means a straight chain alkoxy radical, the carbon atom number $n_1$ of which is 8, 9 or 10;
(b) one or more than one of the compounds represented by the formula (II);

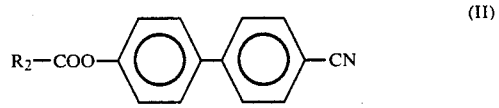

(II)

wherein $R_2$ means a straight chain alkyl radical, the carbon atom number $n_2$ of which is 8 or 9; and
(c) one or more than one of the compounds represented by the formula (III);

(Abstract continued on next page.)

(III)

wherein $R_3$ means a straight chain alkyl or alkoxy radical, the carbon atom number of which is 8, 9, 10, 11 or 12.

By such combinations of the components the material having a broad liquid crystal phase temperature range and enabling erasion at a low electric potential is obtained.

14 Claims, 2 Drawing Figures

LIQUID CRYSTAL MATERIAL FOR A THERMAL WRITING LIQUID CRYSTAL ELEMENT

BACKGROUND OF THE INVENTION

1. Field of the Invention

The present invention relates to a liquid crystal material for use in a thermal writing liquid crystal element utilizing the thermo-optic effect of liquid crystals.

2. Description of the Prior Art

When some portions of a thin layer of cholesteric phase or smectic phase liquid crystal showing a transparent texture are heated and then rapidly cooled, such portions are in general changed to a phase of a light scattering opaque texture. Such phenomenon is known as a thermo-optic effect of liquid crystals.

Some proposals have been made to employ present liquid crystal elements for writing information therein by utilizing the above phenomenon, that is, by giving partial temperature changes to a liquid crystal cell to alter the partial portions opacity. For example, direct observation type display elements to observe the direct video image as written, light valve elements for use in projection type display to observe, by projection, the video image as written, recording elements to read out the written informations therefrom by electric or optic means, etc. have been proposed. There are also some known methods of writing informations in the elements, for example, a method to radiate a laser beam thereby to elevate the temperature of the irradiated portions, a method to cause temperature elevation by means of Joule heating at resistors, etc. Only for the purpose of simplification, the present invention will be explained hereinafter with respect to an example limited to the application to a light valve element which is used in a projection type display unit for writing a video image in a liquid crystal cell by radiation of laser beam and observing the written video image as enlarged and projected by means of a separate optical system.

At an early stage, liquid crystal compounds used for the thermal writing light valves were of what is called "Schiff's base" series represented by the formula (1):

It is because no compounds other than those of the Schiff's base series had been found to have the properties required to the liquid crystal materials for light valves, that is, to show smectic phase at the operation temperatures, namely around the room temperatures, and to have a suitable phase transition temperature. The suitable phase transition temperature relates to the temperature Tc at which the liquid crystal changes into the isotropic liquid phase. Too high Tc requires greater elevation of the temperature for writing which is not advantageous in respect of the required electric power and the writing speed. On the other hand, too low Tc brings about lower contrast. One of the reasons for such lower contrast is that the order parameter of the alignment of the liquid crystal molecules is lowered owing to the fact that the temperature of the liquid crystal at the steady state after writing is near to the phase transition temeperature Tc. Such liquid crystal compounds as above of the Schiff's base series are reported by Gary N. Taylor, et al. of Bell Laboratories in the "Journal of Applied Physics", Vol. 45, No. 10, October 1974, pages 4330-4338.

It is however widely known that these liquid crystal compounds of Schiff's base series are readily hydrolysed and so the thermal writing elements made of such compounds have short lifetimes particularly in respect of the humidity resistance and thus are lacking in the reliability. Under the circumstances, attempts have been made to provide improved liquid crystal materials and thus chemically stable liquid crystal compounds of biphenyl series of the formula (2):

wherein R means an alkyl or alkoxy radical have been produced. In the report made by A. G. Dewey of IBM Research Laboratory in "The Physics and Chemistry of Liquid Crystal Devices" published from Plenum Publishing Corp. (1980) at pages 219-239, it is described that the mixture of three components each selected from the group of the liquid crystal compounds having the constitution of said formula (2) wherein R stands for $C_8H_{17}$, $C_9H_{19}$, $C_{10}H_{21}$, $C_{11}H_{23}$, $C_8H_{17}O$ or $C_9H_{19}O$ is most suitable for use in thermal writing light valves. Further, according to the report by J. C. Dubois of Thomson-CSF, Laboratoire Central de Recherches in "Annales de Physique" (1978) v. 3, at pages 131-138, the comparison and study of the mixtures of components selected from the group of the liquid crystal compounds having the constitution of the formula (2'):

wherein R' stands for $C_8H_{17}$, $C_9H_{19}$, $C_3H_7O$, $C_8H_{17}O$, $C_8H_{17}COO$ or $C_9H_{19}COO$ have revealed that the mixture of three components each corresponding to the case $R' = C_8H_{17}$, $C_9H_{19}$ or $C_9H_{19}COO$ is most suitable for use in the thermal writing light valves. Therefore some improvements have been achieved and the defects of short lifetime, low reliability, etc. as accompanied in the case of early found Schiff's base series liquid crystal compounds have been overcome to some extent.

It has been noted however that the above mentioned known liquid crystal materials are still insufficient particularly in respect of the liquid crystal phase temperature ranges. For instance, the mixture of the compounds of the formulae (3) (4):

as recommended by Dewey as above has the phase transition temperature Tm between crystal and liquid crystal of about 12° C., and the mixture of the three compounds of the formulae (3) (5) (6):

(3)

(5)

(6)

as recommended by Dubois as above has Tm of 8° C. The liquid crystal light valve made from such materials as above crystallizes when it is cooled to the temperature Tm, that is, around 10° C. or lower. After crystallization, it naturally does not operate and, owing to such crystallization history, it has a defect in its liquid crystal molecule alignment even after restoration of the temperature, which defect causes disadvantage of deteriorating video quality of display. In practice, it is extremely inconvenient that the lower limit of the storage temperature is restricted to an extent of 10° C. and there is a strong practical demand for the temperature around −10° C., as being widely known. The actual circumstances are as mentioned above and thus no satisfactory light valves can be obtained by the use of the known liquid crystal materials.

The present inventor has investigated in detail the relation between the transition temperature and the display performance of the liquid crystal materials and conducted experiments and studies on a great number of liquid crystal materials. As the result, it has successfully been found that certain mixtures of liquid crystal compounds have wide temperature range of liquid crystal phase and made it possible to provide elements having a high performance that could not hitherto be obtained. The present invention thus has been accomplished.

SUMMARY OF THE INVENTION

The purpose of the invention is, therefore, to provide a liquid crystal material having excellent properties for use in a thermal writing liquid crystal element.

The liquid crystal material of the present invention is one for use in a thermal writing liquid crystal element in which informations are written by application of heat to some partial portions. The characteristic feature of the material of the present invention is that it contains essentially the following components (a); or (a)+(b) in place of (a); and (c);

(a) one or more than one of the compounds represented by the formula (I);

(I)

wherein $R_1$ means a straight chain alkoxy radical, the carbon atom number $n_1$ of which is 8, 9 or 10;

(b) one or more than one of the compounds represented by the formula (II);

(II)

wherein $R_2$ means a straight chain alkyl radical, the carbon atom number $n_2$ of which is 8 or 9; and

(c) one or more than one of the compounds represented by the formula (III);

(III)

wherein $R_3$ means a straight chain alkyl or alkoxy radical, the carbon atom number of which is 8, 9, 10, 11, or 12.

As it is understood from the above, the combinations of the components possible in the material of the present invention include two groups, one being (a)+(c) and the other being (a)+(b)+(c).

The component (a) of the formula (I) is new, but can be prepared from the commercially available compounds, such as p-aminophenol, carbon disulfide and dicyclohexyl carbodiimide (=DCC), etc., in the presence of pyridine, etc., according to the following reaction:

More detailed informations on the synthesis may be obtained from the manufacturer "Kawasaki Chemical Industry Co., Ltd." of Kawasaki City, Japan, by whom the inventor was supplied with the compounds of the component (a) as test samples and completed the present invention. In effect, the above synthesis method is later reported in the conference "11th Liquid Crystal Forum" held at Kanazawa University on Oct. 4–5th, 1985.

The component (b) of the formula (II) is known as mentioned above regarding the compounds of the formulae (2′) and (6) and also as described in the report by J. C. Dubois and A. Zann in "Journal de Physique", Colloque C3, June 1976, Vol. 37, pages C3-35 to C3-40. The test samples of the compounds of the component (b) used were manufactured by the synthesis method described in this literature.

The component (c) of the formula (III) also is known, as mentioned above regarding the compounds of the formulae (2)–(5). The test samples of the compounds of the component (c) used were commercial products sold by Merck Japan Co., Ltd. in the market.

The mixed liquid crystals of the present invention have achieved the merit of extremely wide smectic phase temperature range by the above mentioned constitution of the ingredients and also the merit of enabling the erasion of the written informations in a thermal writing liquid crystal element at a lower electric potential, because the main ingredients have great dielectric anisotropy.

EXAMPLES

The present invention will hereinafter be explained in detail with reference to its working Examples.

EXAMPLE 1

A compound represented by the formula (7)

(7)

and a mixture in a ratio 58.6:31.4:8.2:1.8 by weight of the four compounds represented by the formulae (3), (8), (9) and (10):

(3)

(8)

(9)

(10)

which mixture will hereinafter be referred to as NSP36A, are mixed together in various ratios and the phase transition temperatures of such liquid crystal mixtures are determined. The results are shown in FIG. 1, wherein I, N, S and C represents respectively the regions corresponding to the phases of isotropic liquid, nematic liquid crystal, smectic liquid crystal and solid crystal.

Figure 1:
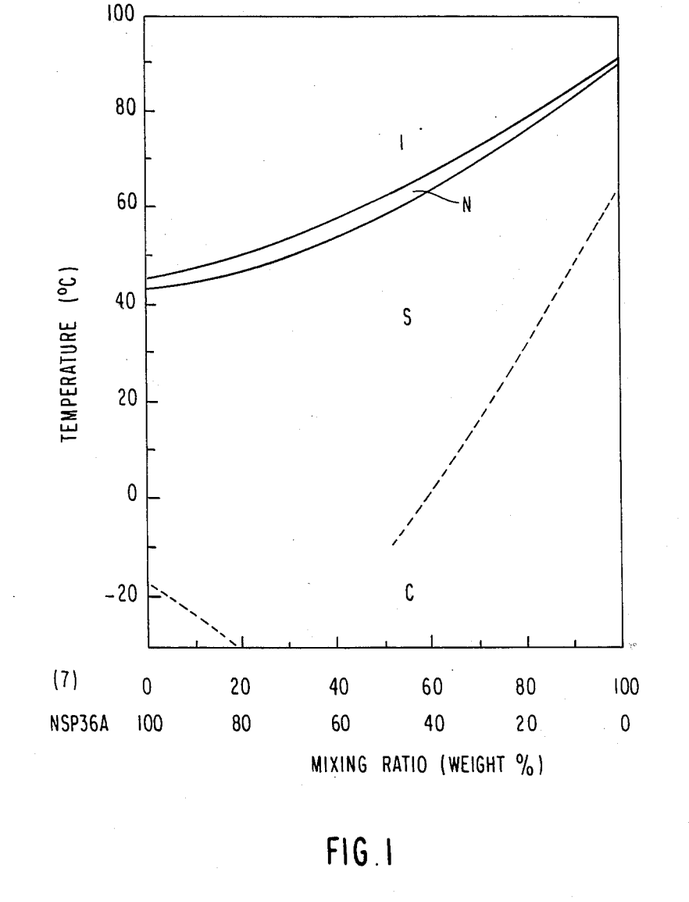
FIGS. 1 and 2 as attached are to illustrate the results of the determination of the phase transition temperatures of the liquid crystal mixtures respectively of the following Examples 1 and 2.

As it is clearly understood from FIG. 1, the mixed liquid crystals containing the compound (7) have not only a merit of an elevated Tc, but also a preferable feature that the nematic phase is not broadened. Further, in the mixture containing around 60% by weight or less of the compound (7), Tm is 0° C. or lower and so is suffficiently low. Thus the mixture containing the compound (7) preferably at the ratio around 60% by weight or less has the extremely broad smectic phase temperature range and the sufficiently low Tm. For example, a mixed liquid crystals consisting of 75% by weight of NSP36A and 25% by weight of the compound (7), which mixture will hereinafter be referred to as NSP35B, has an extremely low Tm of −43.5° C. and accordingly the liquid crystal light valve made of NSP35B will operate at storage temperature of −10° C. without trouble. Further, NSP35B has Tc of 51.5° C. and nematic temperature range of 3.1° C., both are most suitable for writing when used for the light valve. Namely in an example, an argon laser beam of 300 mW radiant quantity is radiated to the light valve made of NSP35B for 1 microsecond per one point to write a video image, and the image is projected on a screen of gain 6.4 by means of a xenon lamp of 1 KW radiation quantity. The contrast obtained is 10:1 at the brightness of 100 foot-lamberts. The erasion of the video image can be made by applying electric potential of 90 V. In view of the contrast 7:1 and the erasion potential 100 V of a light valve made of a conventional liquid crystal material tested under same writing condition, the results show that NSP35B has superior display performances. Similar extremely excellent performances have been found also in various mixed liquid crystals of different mixing ratios of NSP36A and the compound (7). Moreover, similar effects have been obtained also by using, in place of the compound (7), one of the compounds represented by the formulae (11) and (12):

(11)

(12)

or two or three of the compounds represented by the formulae (7), (11) and (12). Moreover, similar effects have been obtained also by using, in place of NSP36A, one or plurality of the compounds represented by the aforementioned formulae (3), (8), (9) and (10) and the following formulae (13), (14), (15), (16), (17) and (18):

(13)

(14)

(15)

-continued

Some examples of mixing ratio of such effective mixtures and their Tc are shown in the following TABLE 1. Their Tm are all equal to or lower than −10° C.

TABLE 1

| No. | Mixing Ratio | Tc (°C.) |
|---|---|---|
| 1. | (3):(9):(7) = 78.9:12.1:9.0 | 50.2 |
| 2. | (3):(9):(12) = 82.1:12.9:5.0 | 48.6 |
| 3. | (3):(8):(7) = 62.8:31.0:6.2 | 46.4 |
| 4. | (3):(8):(12) = 63.2:31.3:5.5 | 48.1 |
| 5. | (3):(10):(7) = 86.1:3.7:10.2 | 47.6 |
| 6. | (3):(10):(12) = 87.5:3.9:8.6 | 49.7 |
| 7. | (3):(8):(9):(7) = 58.5:28.8:7.3:5.4 | 49.1 |
| 8. | (3):(8):(10):(7) = 62.0:30.6:1.7:5.7 | 47.3 |
| 9. | (3):(9):(10):(7) = 76.9:11.6:2.9:8.6 | 51.2 |
| 10. | (3):(9):(10):(12) = 79.7:12.3:3.1:4.9 | 49.8 |
| 11. | (3):(9):(7):(12) = 75.9:11.3:8.4:4.4 | 51.7 |
| 12. | (3):(10):(7):(12) = 82.1:3.3:9.3:5.3 | 49.3 |
| 13. | (3):(9):(10):(7):(12) = 53.6:6.3:26.2:4.6:9.3 | 66.6 |

EXAMPLE 2

A mixture in a ratio 1:1 by weight of the two compounds represented by the formulae (7) and (6)

which mixture will hereinafter be referred to as NSPX, and the mixture NSP36A of Example 1 are mixed together in various ratios and the phase transition temperatures of such liquid crystal mixtures are determined. The results are shown in FIG. 2, wherein I, N, S and C represents respectively the regions corresponding to the phases of isotropic liquid, nematic liquid crystal, smectic liquid crystal and solid crystal.

Figure 2:
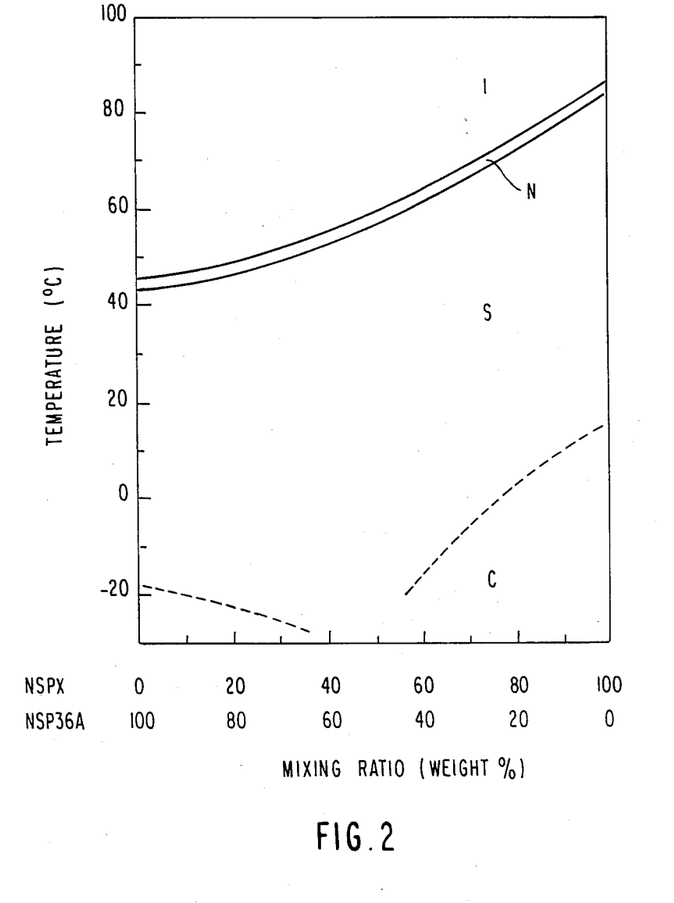

As it is clearly understood from FIG. 2, the mixed liquid crystals containing NSPX have not only a merit of an elevated Tc, but also a preferable feature that the nematic phase is not broadened. Further, in the mixture containing around 75% by weight or less of NSPX, Tm is 0° C. or lower and so is sufficiently low. Thus the mixture containing NSPX preferably at the ratio around 75% by weight or less has the extremely broad smectic phase temperature range and the sufficiently low Tm. For example, a mixed liquid crystal consisting of 45% by weight of NSPX and 55% by weight of NSP36A, which mixture will hereinafter be referred to as NSP37B, has an extremely low Tm of −32.7° C. and accordingly the liquid crystal light valve made of NSP37B will operate at storage temperature of −10° C. without trouble. Further, NSP37B has Tc of 57.3° C. and nematic temperature range of 3.2° C., both are most suitable for writing when used for the light valve. Namely in an example, an argon laser beam of 300 mW radiant quantity is radiated to the light valve made of NSP37B for 1 microsecond per one point to write a video image, and the image is projected on a screen of gain 6.4 by means of a xenon lamp of 1 KW radiation quantity. The contrast obtained is 10:1 at the brightness of 100 foot-lamberts. The erasion of the video image can be mady by applying electric potential of 90 V. In view of the contrast 7:1 and the erasion potential 100 V of a light valve made of a conventional liquid crystal material tested under same writing condition, the results show that NSP37B has superior display performances. Similar extremely excellent performances have been found also in various mixed liquid crystals of different mixing ratios of NSPX and NSP36A. Moreover, similar effects have been obtained also by using, in place of the compound (7), one of the compounds represented by the aforementioned formulae (11) and (12); or in place of the compound (6), a compound represented by the formula (19);

or other combinations of one, two or three of the compounds represented by the formulae (7), (11) and (12) and one or two of the compounds represented by the formulae (6) and (19). Moreover, similar effects have been obtained also by using, in place of NSP36A, one or plurality of the compounds represented by the formulae (3), (8), (9), (10), (13), (14), (15), (16), (17) and (18).

Some examples of mixing ratio of such effective mixtures and their Tc are shown in the following TABLE 2. Their Tm are all equal to or lower than −10° C.

TABLE 2

| No. | Mixing Ratio | Tc (°C.) |
|---|---|---|
| 1. | (3):(6):(7) = 80.7:10.1:9.2 | 49.1 |
| 2. | (3):(6):(12) = 83.6:10.9:5.5 | 47.2 |
| 3. | (3):(9):(6):(7) = 73.2:10.7:8.3:7.8 | 51.2 |
| 4. | (3):(9):(6):(12) = 75.4:11.2:8.8:4.6 | 50.9 |
| 5. | (3):(10):(6):(7) = 78.7:3.0:9.6:8.7 | 50.3 |
| 6. | (3):(10):(6):(12) = 81.3:3.3:10.3:5.1 | 48.5 |
| 7. | (3):(8):(6):(7) = 59.7:29.4:5.4:5.5 | 48.2 |
| 8. | (3):(8):(9):(6):(7) = 56.1:27.5:6.8:4.8:4.8 | 50.6 |
| 9. | (3):(8):(10):(6):(7) = 58.9:29.0:1.6:5.3:5.2 | 48.9 |
| 10. | (3):(9):(10):(6):(7) = 71.8:10.3:2.5:8.0:7.4 | 53.2 |
| 11. | (3):(9):(10):(6):(7):(12) = 69.7:9.8:2.3:7.5:7.0:3.6 | 54.3 |

In the above Examples 1 and 2, the mixed liquid crystals consisting only of the components (a) and (c) or of the components (a), (b) and (c) are mentioned, but the present invention is not limited to such mixtures as exemplified and it is sufficient that these components are essentially contained. Namely liquid crystal compounds having other constitutions may be contained to some extent. Such compounds as having other constitutions are for example those having the following formulae, wherein R represents an alkyl or alkoxy radical:

-continued

-continued

-continued

The above detailed explanation has been made as to the example for use in a light valve for projection type display unit to observe the video image written in a liquid crystal cell by radiation of a laser beam through enlargement and projection by means of separate optical system. The liquid crystal material of the present invention however shows excellent performances in the use for thermal writing by other means, direct observation type display elements, storage elements and the like.

As explained above, the present invention provides liquid crystal materials for thermal writing liquid crystal elements, having excellent performances with a broad liquid crystal phase temperature range and enabling erasion at a low electric potential.

I claim:

1. A liquid crystal material with a smectic phase for a thermal writing liquid crystal element characterized in that it contains essentially the following components (a), or (a)+(b) in place of (a), and (c);

(a) one or more than one of the compounds represented by the formula (I);

(I)

wherein $R_1$ means a straight chain alkoxy radical, the carbon atom number of which is 8, 9 or 10;

(b) one or more than one of the compounds represented by the formula (II);

(II)

wherein $R_2$ means a straight chain alkyl radical, the carbon atom number of which is 8 or 9; and (c) one or more than one of the compounds represented by the formula (III);

(III)

wherein $R_3$ means a straight chain alkyl or alkoxy radical, the carbon atom number of which is 8, 9, 10, 11 or 12.

2. A liquid crystal material according to claim 1, containing essentially the components (a) and (c).

3. A liquid crystal material according to claim 1, containing essentially the components (a), (b) and (c).

4. A liquid crystal material according to any one of claims 1 to 3, wherein the component (a) is a compound having the formula (7), (11) or (12);

(7)

(11)

(12)

or a mixture of any two or three of these compounds of the formulae (7), (11) and (12).

5. A liquid crystal material according to claim 1 or 3, wherein the component (b) is a compound having the formula (6) or (19);

(6)

(19)

or a mixture of these two compounds of the formulae (6) and (19).

6. A liquid crystal material according to any one of claims 1 to 3, wherein the component (c) is a compound having the formula (3), (8), (9) or (10);

(3)

(8)

(9)

(10)

or a mixture of any two to four of these compounds of the formulae (3), (8), (9) and (10).

7. A liquid crystal material according to claim 6, wherein the component (c) is the mixture of the four compounds respectively of the formulae (3), (8), (9) and (10) in a ratio by weight of 58.6:31.4:8.2:1.8.

8. A liquid crystal material according to claim 4, containing the compound of the formula (7), in an amount of 60% or less by weight of the total amount.

9. A liquid crystal material according to claim 3, wherein the component (a) is a compound represented by formula (7):

(7)

and component (b) is a compound represented by formula (6):

(6)

and components (a) and (b) are present as a mixture in a ratio of approximately 1:1 by weight.

10. A liquid crystal material according to claim 9, containing the components (a) and (b) in an amount not more than 75% of the total.

11. A liquid crystal material according to claim 3, wherein the component (a) is a compound represented by formula (7);

(7)

component (b) is a compound represented by formula (6);

(6)

and component (c) is a mixture of the compounds of formulae (3), (8), (9) and (10) in a weight ratio of 58.6:31.4:8.2:1.8, (3)

(8)

(9)

(10)

and wherein components (a) and (b) are present in a 1:1 weight ratio, and components (a+b) and (c) are present in amounts respectively of 45% and 55% by weight of the total amount.

12. A liquid crystal material having a smectic phase for a thermal writing liquid crystal element characterized in that it contains essentially components (a) and (c); component (a) being represented by the compound of formula (7):

(7)

and component (c) being one or more of the compounds represented by the formulae (3), (8), (9) and (10):

(3)

(8)

(9)

(10)

wherein component (a) comprises 60% or less of the total weight, and component (c) comprises the balance.

13. A liquid crystal material as in claim 12, wherein component (a) comprises approximately 25% and component (c) comprises approximately 75%.

14. A liquid crystal material as in claim 12, wherein the weight ratio of compounds (3), (8), (9) and (10) are approximately 58.6:31.4:8.2:1.8.

* * * * *